(12) United States Patent
Suwa et al.

(10) Patent No.: US 6,883,048 B2
(45) Date of Patent: Apr. 19, 2005

(54) ELECTRONIC DEVICE SYSTEM WITH DETACHABLE COMPUTER

(75) Inventors: Katsuhiko Suwa, Osaka (JP); Kazunori Terano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 445 days.

(21) Appl. No.: 10/222,869

(22) Filed: Aug. 19, 2002

(65) Prior Publication Data

US 2004/0034729 A1 Feb. 19, 2004

(51) Int. Cl.[7] .............................................. G06F 13/12
(52) U.S. Cl. ............................. 710/73; 710/72; 710/62; 345/156; 345/168
(58) Field of Search ............................. 710/72, 73, 62; 345/156, 168, 169

(56) References Cited

U.S. PATENT DOCUMENTS 5,526,493 A * 6/1996 Shu ............................ 710/304
5,768,164 A * 6/1998 Hollon, Jr. ................... 708/174
5,922,041 A * 7/1999 Anderson .................... 701/200
6,460,109 B1 * 10/2002 Kaply et al. .................. 710/73
6,532,149 B1 * 3/2003 Dhar et al. ................... 361/683

FOREIGN PATENT DOCUMENTS

| JP | 62-206698 | 9/1987 |
|----|-----------|--------|
| JP | 10-260759 | 9/1998 |

* cited by examiner

Primary Examiner—Kim Huynh
(74) Attorney, Agent, or Firm—Wenderoth, Lind & Ponack, L.L.P.

(57) ABSTRACT

In an electronic device system, a computer is connected to a port replicator connectable to an extended input device and extended liquid crystal display device. The system enables the notebook computer to be easily detached even when the system is installed in a vehicle. Accordingly, information stored in the computer is easily retrievable when any problem occurs to the vehicle where the system is installed.

4 Claims, 4 Drawing Sheets

ELECTRONIC DEVICE SYSTEM WITH DETACHABLE COMPUTER

FIELD OF THE INVENTION

The present invention relates to an electronic device system including a notebook computer, a port replicator, an extended input device, and an extended liquid crystal display device.

BACKGROUND OF THE INVENTION

A conventional electronic device system includes a desktop computer, an extended input device, and an extended liquid crystal display device.

FIG. 4 shows the conventional electronic device system. The system includes desktop computer 21, extended input device 22, liquid crystal display 23, signal cable 24 for transmitting signals between desktop computer 21 and extended input device 22, and signal cable 25 for transmitting video signals from desktop computer 21 to liquid crystal display 23.

If the conventional electronic device system is installed in a vehicle, such as a police car, desktop computer 21 is physically attached to the vehicle. Accordingly, if any problem occurs with the vehicle, or if anyone requires operating the system in an office, information stored in desktop computer 21 is not easily retrievable. In the worst case, information may be lost.

SUMMARY OF THE INVENTION

An electronic device system includes: a computer having a display unit, an input unit, and an extension terminal; a port replicator which can be connected to the extension terminal and has plural input/output (I/O) terminals; an input device which has a first key having substantially a key alignment identical to the input unit; a display device which displays a screen identical to the display unit and has a second key having the same function as the first key; a first cable for transmitting signals between the port replicator and input device; a second cable for transmitting signals between the port replicator and the liquid crystal display device; and a third cable for transmitting signals between the input device and the liquid crystal display device.

Since the computer is detachable from the electronic device system, important information is protected, and user's operation efficiency improves.

DESCRIPTION OF THE PREFERRED EMBODIMENT

Embodiment 1

Figure 1:
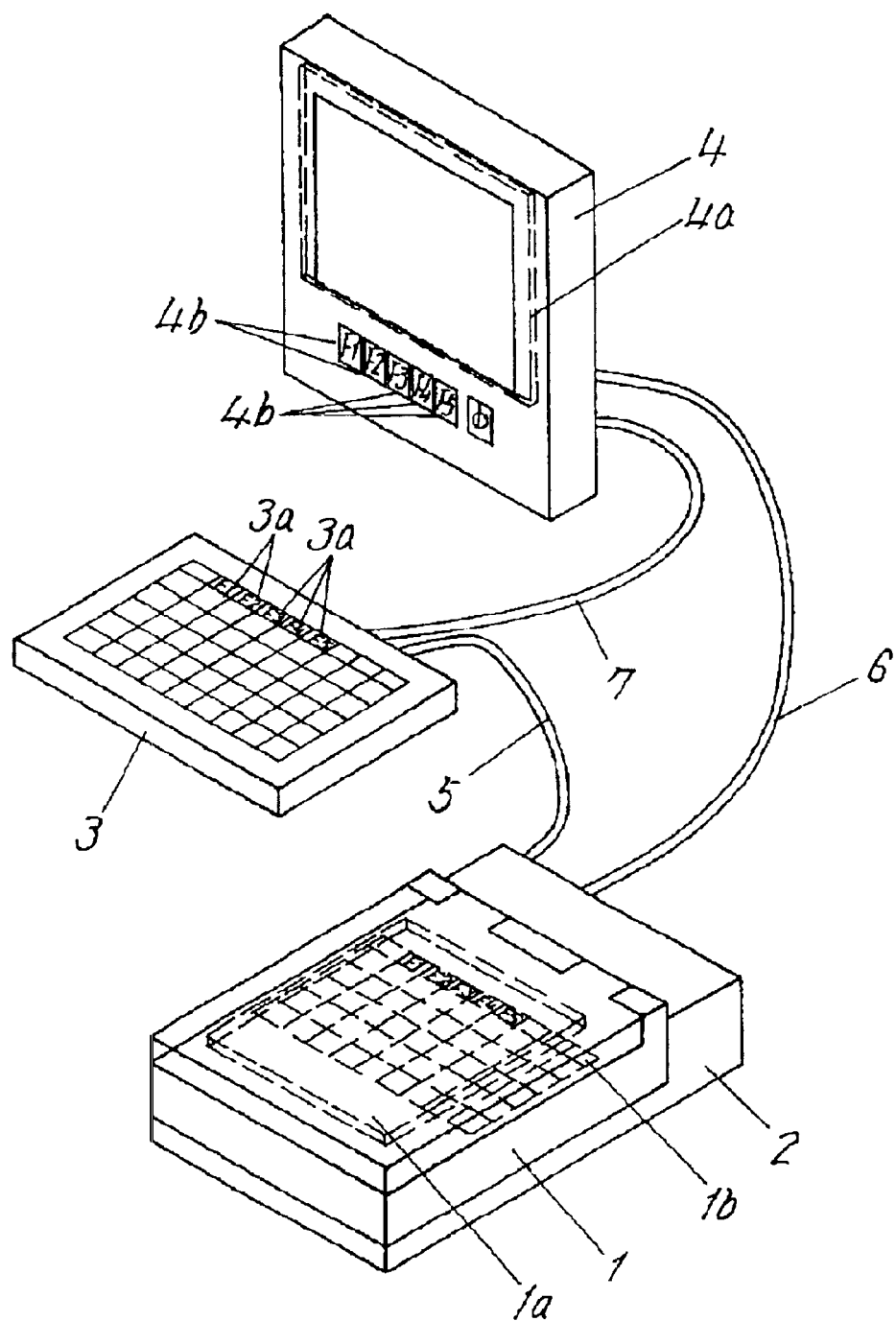
FIG. 1 is a perspective of an electronic device system in accordance with exemplary embodiment 1 of the present invention.

FIG. 1 is a perspective of an electronic device system according to exemplary embodiment 1 of the present invention. Notebook computer 1 includes liquid crystal display (LCD) unit 1a and input unit 1b. Port replicator 2 is connectable to an extension terminal (not illustrated) mounted to notebook computer 1, and has plural input/output (I/O) terminals. Extended input device 3 has a key alignment substantially identotcal to notebook computer 1. Extended LCD device 4 includes LCD unit 4a for displaying a screen identical to notebook computer 1 and plural function keys 4b which have the same functions as plural function keys 3a in extended input device 3. Signal cable 5 transmits signals between port replicator 2 and extended input device 3. Signal cable 6 transmits signals between port replicator 2 and extended LCD device 4. Signal cable 7 transmits signals between extended input device 3 and extended LCD device 4.

If the electronic device system as configured above is installed in a vehicle, such as a police car, (installation means to the vehicle not illustrated), information in computer 1 can be secured even if an accident occurs to the vehicle because notebook computer 1 is immediately detachable.

If a user needs to operate individually or if the user needs to work at his/her desk after completing operations in the vehicle, notebook computer 1 is easily detachable from the vehicle for continuing the work at the desk.

Moreover, if the vehicle is stolen, information in computer 1 is hardly stolen together because computer 1 is detachable from the vehicle, and this improves risk management and security of information.

Extended LCD device 4 has frequently-used function keys 4b independently. This allows the user to view the screen and press function keys 4b near the screen. The user does not need to move their eyes to function keys 3a on extended input device 3. This eliminates unnecessary eye movement while driving the vehicle, thus improving both safety and ease of operation.

Each key on extended input device 3 may be designed to emit light independently using light-emitting materials, and an area of the input keys is visible during night patrols.

Embodiment 2

Figure 2:
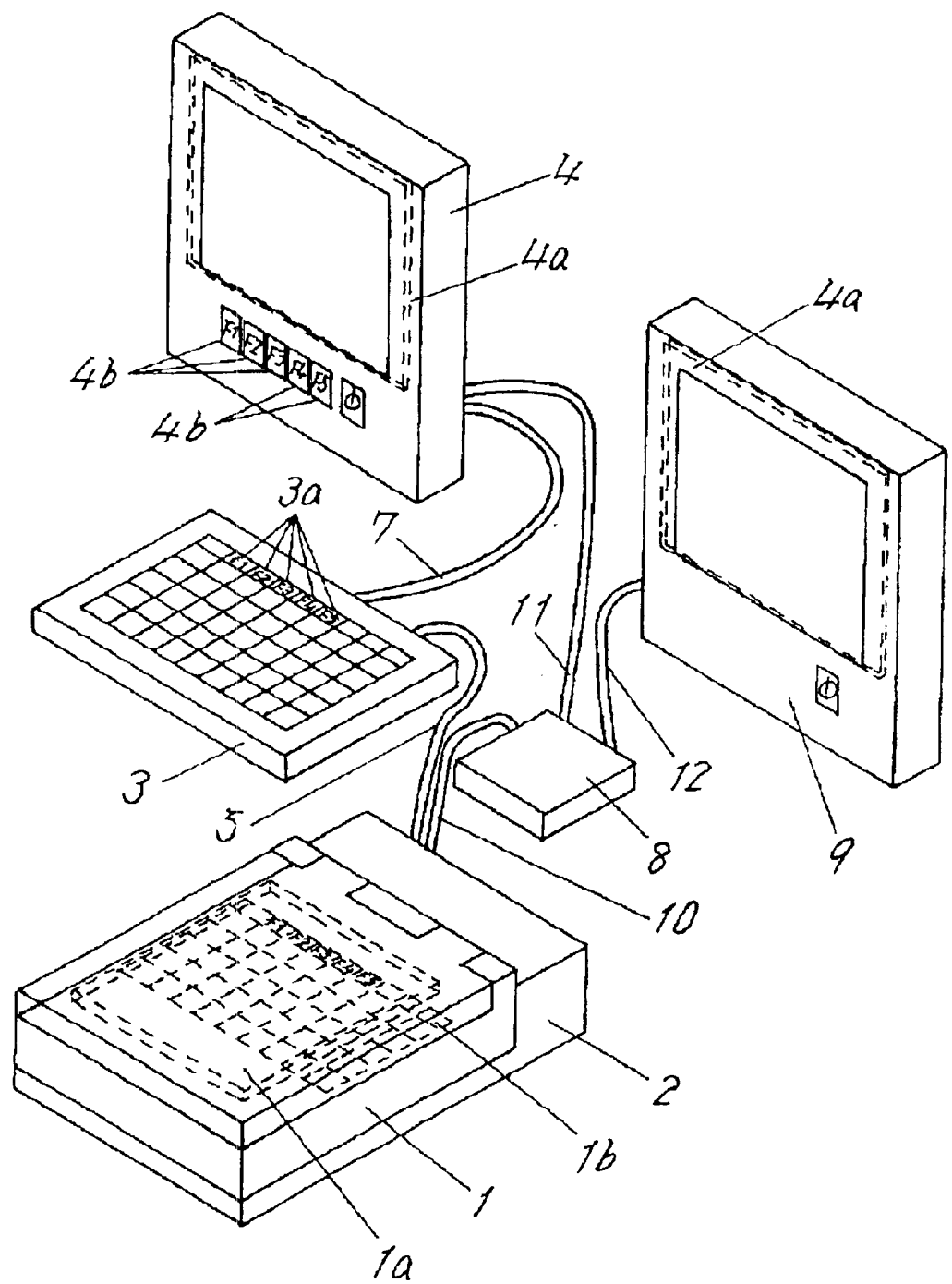
FIG. 2 is a perspective of an electronic device system in accordance with exemplary embodiment 2 of the invention.

FIG. 2 is a perspective view of an electronic device system according to exemplary embodiment 2 of the present invention. Elements in FIG. 2 which are the same as those in embodiment 1 are denoted by the same numerals to omit their descriptions. Video distributor 8 outputs the same screen signals as for liquid crystal display (LCD) unit 1a in notebook computer 1. Second extended LCD device 9 displays the same screen as notebook computer 1. Signal cable 10 transmits signals between port replicator 2 and video distributor 8. Signal cable 11 transmits signals between video distributor 8 and extended LCD unit 4. Signal cable 12 transmits signals between video distributor 8 and extended LCD device 9.

If First Aid needs to be provided to an emergency patient, the same information needs to be confirmed simultaneously at a driver seat and at a First Aid area which is away from the driver seat. If the electronic device system as configured above is installed in a vehicle, such as an ambulance, (installation means to the vehicle not illustrated), the same screen is displayed simultaneously on two extended LCD devices. Accordingly, information can be confirmed at different areas in the vehicle.

Embodiment 3

Figure 3:
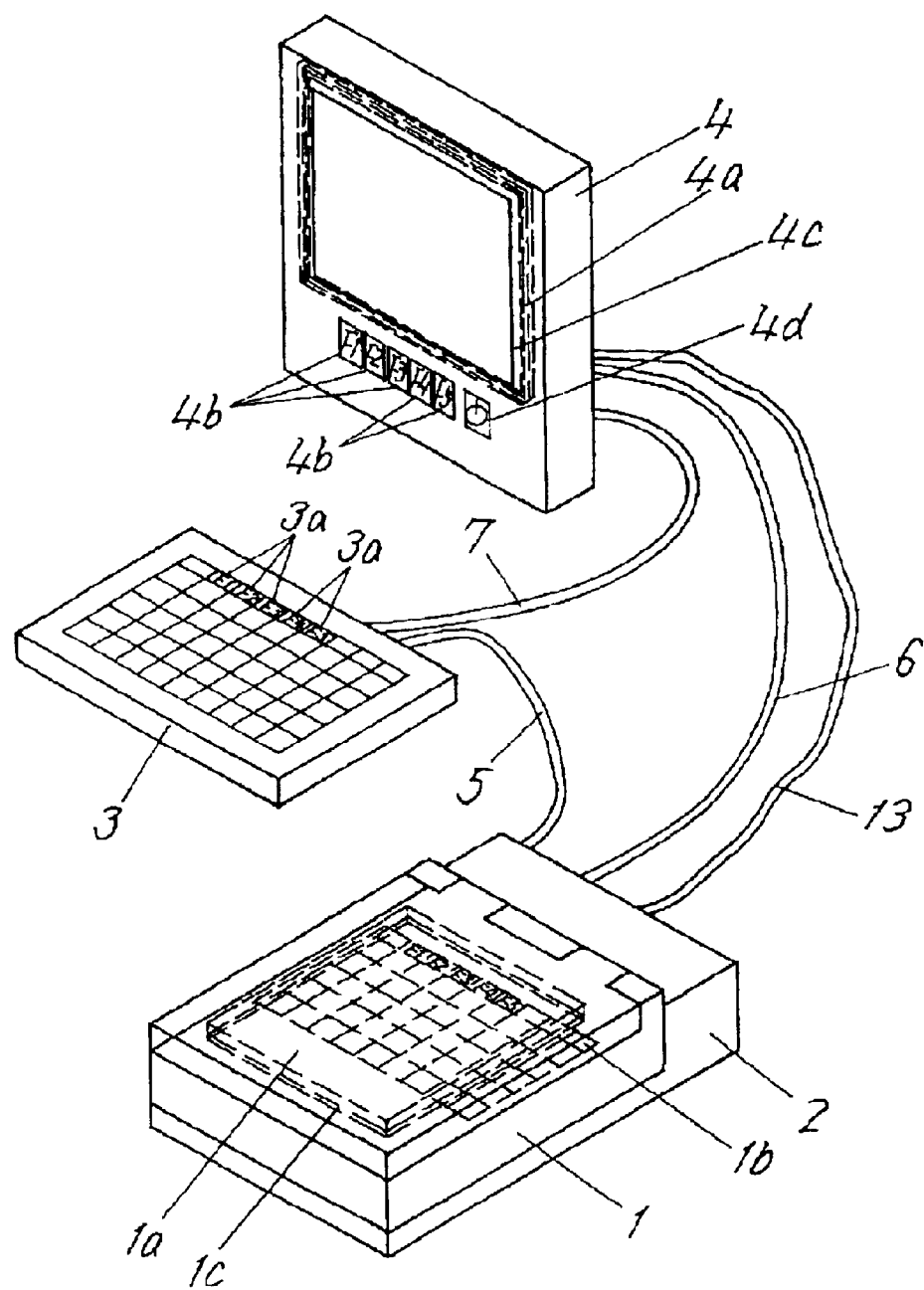
FIG. 3 is a perspective of an electronic device system in accordance with exemplary embodiment 3 of the invention.
Figure 4:
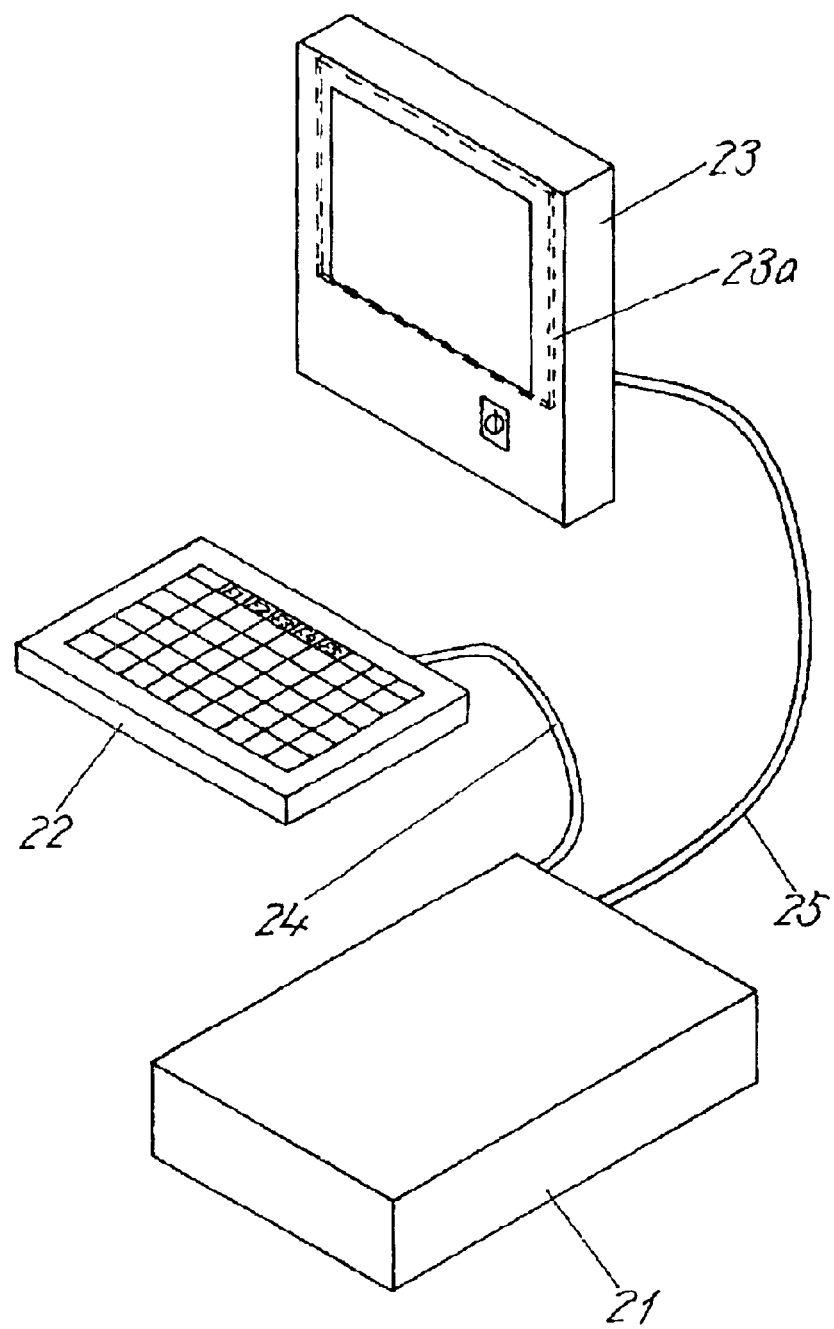
FIG. 4 is a perspective of a conventional electronic device system.

FIG. 3 is a perspective of an electronic device system according to exemplary embodiment 3 of the present invention. Elements in FIG. 3 which are the same as those in the first exemplary embodiment are denoted by the same numerals to omit their descriptions. Touch screen 1c is mounted on liquid crystal display (LCD) unit 1a in notebook computer 1, and is pressed to input signals. Touch screen 4c is mounted on extended LCD device 4, and is pressed to input signals. Signal cable 13 transmits signals between port replicator 2 and extended LCD device 4.

The electronic device system as configured above enables a user to input information on a screen of LCD unit 3. Accordingly, most operations are executable on LCD unit 3, thus improving operational efficiency.

LCD unit 1a of notebook computer 1 in the electronic device system according to embodiments 1 to 3 is closed. However, notebook computer 1 is turned on and activated upon power switch 4d of extended LCD device 4 being turned on. In addition, extended input device 3 is operable upon power switch 4d being turned on. Accordingly, notebook computer 1 may not be turned on directly, and extended LCD device 4 may not be turned on again.

What is claimed is:

1. An electronic device system comprising:
   a computer including a display unit, an input unit, and an extension terminal;
   a port replicator connectable to said extension terminal, said port replicator having a plurality of input/output terminals;
   an input device having a first key, said input device having a key alignment substantially identical to said input unit;
   a display device having a second key which has the same function as said first key, said display device displaying the same screen as said display unit;
   a first cable for transmitting a signal between said port replicator and said input device;
   a second cable for transmitting a signal between said port replicator and said display device; and
   a third signal transmission cable for transmitting a signal between said input device and said display device.

2. The electronic device system as defined in claim 1, further comprising:
   a first touch screen provided on said display unit, for inputting a signal upon being pressed;
   a second touch screen provided on said display device, for inputting a signal upon being pressed; and
   a fourth cable for transmitting an input signal from said second touch-screen between said port replicator and said display device.

3. An electronic device system comprising:
   a computer having a display unit, an input unit, and an extension terminal;
   a port replicator connectable to said extension terminal, said port replicator having a plurality of input/output terminals;
   an input device having a first key, said input device having a key alignment substantially identical to said input unit;
   a video distributor for outputting a screen signal identical to a signal for said display unit;
   a first display device for displaying a signal from said video distributor, said first display device having a second key which has the same function as said first key;
   a second display device for displaying a signal from said video distributor;
   a first cable for transmitting a signal between said port replicator and said input device;
   a second cable for transmitting a signal between said port replicator and said video distributor;
   a third cable for transmitting a signal between said video distributor and said first display device;
   a fourth cable for transmitting a signal between said video distributor and said second display device; and
   a fifth cable for transmitting a signal between said input device and said first display device.

4. The electronic device system as defined in claim 3, further comprising:
   a first touch screen provided on said display unit, for inputting a signal upon being pressed;
   a second touch screen provided on said first display device, for inputting a signal upon being pressed; and
   a sixth cable for transmitting said signal input from said second touch screen between said port replicator and said display device.

* * * * *